United States Patent [19]

Kostorz et al.

[11] Patent Number: 5,230,465
[45] Date of Patent: Jul. 27, 1993

[54] CONTROL KNOB FOR A THERMOSTATICALLY REGULATED VALVE

[75] Inventors: Jan R. Kostorz, Menden; Christian Frankholz, Schwerte, both of Fed. Rep. of Germany

[73] Assignee: Friedrich Grohe Aktiengesellschaft, Hemer, Fed. Rep. of Germany

[21] Appl. No.: 914,760

[22] Filed: Jul. 15, 1992

[30] Foreign Application Priority Data

Jul. 18, 1991 [DE] Fed. Rep. of Germany ....... 4123856

[51] Int. Cl.5 ............................................ G05D 23/12
[52] U.S. Cl. ....................................... 236/121; 236/42
[58] Field of Search ..................... 236/12.1, 42, 99 R, 236/12.16–12.23

[56] References Cited

U.S. PATENT DOCUMENTS

| | | | |
|---|---|---|---|
| 4,290,553 | 9/1981 | Molgaard et al. | 236/42 |
| 4,304,358 | 12/1981 | Riis | 236/12.1 |
| 4,508,262 | 4/1985 | Pedersen et al. | 236/42 |
| 4,508,263 | 4/1985 | Pedersen et al. | 236/42 |
| 4,558,819 | 12/1985 | McDonald | 236/42 |
| 5,143,286 | 9/1992 | Hansen et al. | 236/42 |

FOREIGN PATENT DOCUMENTS 1161460 1/1964 Fed. Rep. of Germany .
3530812 3/1987 Fed. Rep. of Germany .

Primary Examiner—William E. Tapolcai
Attorney, Agent, or Firm—Herbert Dubno; Andrew M. Wilford

[57] ABSTRACT

A thermostatically regulated mixing valve having a housing and a stem extending along an axis in the housing and axially displaceable to adjust the thermostatically regulated temperature of the valve has a control knob that has a nut threaded on the housing, axially linked to the valve stem, and rotatable about the axis in one direction to move axially inward and move the stem axially inward and in the opposite direction to move axially outward and move the stem axially outward. An inner knob part formed with an angularly extending and axially throughgoing slot is axially coupled to the housing and rotationally coupled to the nut so that the inner knob part rotates with the nut but does not move axially therewith. A stop fixed relative to the housing offset from the axis is angularly engageable with an abutment carried on an outer knob part, projecting through the slot, and displaceable between a normal position angularly engageable with the stop and a displaced position angularly out of alignment with the stop. Formations releasably secure the outer knob part on the inner knob part in any of a plurality of angularly offset positions relative to each other.

9 Claims, 4 Drawing Sheets

CONTROL KNOB FOR A THERMOSTATICALLY REGULATED VALVE

FIELD OF THE INVENTION

The present invention relates to a thermostatically regulated valve. More particularly this invention concerns a control knob for such a valve.

BACKGROUND OF THE INVENTION

A standard thermostatically regulated valve such as described in German patent 3,530,812 filed Aug. 29, 1985 by J. Kostorz has hot- and cold-water inlets connected to respective valve seats whose other sides open into an outlet compartment from which tempered water flows. A double valve body is displaceable in one direction to increase the flow from one of the inlets to the outlet compartment and decrease the flow from the other compartments and is oppositely movable for the opposite effect. This valve body can be moved by axially displacing an externally displaceable stem, and is also provided with a temperature-sensitive element in the outlet compartment that can change length to move the valve element and keep it at the setting it is originally put into. Thus once a given mixed-water temperature is set, the temperature-sensitive element will automatically move the valve bodies in response, for instance, to varying supply temperatures to keep the output temperature steady.

The manual setting of such a valve is typically by means of a simple knob mounted on the rotatable and axially displaceable valve stem. In addition in order to prevent the user from accidentally scalding himself or herself, it is standard to provide abutments which limit the angular travel of the knob so that it cannot be turned too far in the hot direction past a predetermined maximum safe temperature. Some means is also provided, typically in the form of a depressible latch button, to eliminate this safety feature. Such an arrangement is disadvantageous in that the safe temperature cannot be changed readily. In addition the knob moves axially with the stem so it is not possible to provide an accurately readable scale indicating the set temperature.

In another system known from German patent document 1,161,460 filed Sep. 27, 1962 by W. Gruber a scale is provided that is fixed on the valve housing and that indicates the maximum safe temperature the valve is set to. A button can be depressed to change this temperature and establish a new range of adjustment for the valve. Such an arrangement cannot, however, be used on a valve where the stem moves axially when it is rotated.

OBJECTS OF THE INVENTION

It is therefore an object of the present invention to provide an improved control setup for a thermostatically regulated valve.

Another object is the provision of such an improved control setup for a thermostatically regulated valve which overcomes the above-given disadvantages, that is which allows the maximum temperature to be reset, which provides an accurate readout of what the maximum temperature is, and which also can be used on a standard thermostatic valve whose stem moves axially when it moves angularly.

SUMMARY OF THE INVENTION

A thermostatically regulated mixing valve having a housing and a stem extending along an axis in the housing and axially displaceable to adjust the thermostatically regulated temperature of the valve has a control knob that has according to the invention a nut threaded on the housing, axially linked to the valve stem, and rotatable about the axis in one direction to move axially inward and move the stem axially inward and in the opposite direction to move axially outward and move the stem axially outward. An inner knob part formed with an angularly extending and axially throughgoing slot is axially coupled to the housing and rotationally coupled to the nut so that the inner knob part rotates with the nut but does not move axially therewith. A stop fixed relative to the housing offset from the axis is angularly engageable with an abutment carried on an outer knob part, projecting through the slot, and displaceable between a normal position angularly engageable with the stop and a displaced position angularly out of alignment with the stop. Formations releasably secure the outer knob part on the inner knob part in any of a plurality of angularly offset positions relative to each other.

Thus with this system the knob does not move axially on the housing as the temperature is adjusted as is desired in modern-day plumbing fittings. The temperature range is normally limited to a maximum temperature which can be overridden easily by pushing the abutment into the displaced position. The maximum normal temperature can easily be changed by decoupling the outer knob part from the inner knob part, changing its angular position somewhat, and then reinstalling it.

According to another feature of this invention the formations axially coupling the inner knob part to the housing include a radially outwardly open groove in the housing and radially deflectable latching fingers engageable in the groove. The outer knob part has a wall blocking radial outward deflection of the fingers when the outer knob part is in the normal position. Thus the inner knob part can be snap installed to the housing, or to a base ring carried thereby and itself provided with the abutment, and once the outer knob part is in place this inner knob part cannot be removed.

The inner knob part according to the invention a large-diameter lower part bearing a temperature scale, an intermediate diameter middle part carrying the respective axial coupling formations, and a small-diameter upper part carrying the respective rotational-coupling formations. Furthermore the securing formations include a plurality of radially deflectable and axially extending snap fingers operatively engageable with the housing. Thus the entire unit can be put together without the use of tools or extra parts.

In accordance with a further feature of this invention in the adjustment position the securing formations prevent separation of the knob parts from each other. Thus when the outer knob part is moved into the adjustment position it is still mounted on the assembly, it does not become a loose part that could get lost.

The outer-knob-part abutment has one end formed with an inclined surface cammingly engageable with the stop on rotation of the outer knob part in a direction decreasing water temperature to elastically deflect the abutment into the displaced position. Hence if the maximum setting is overridden and the knob is set to a higher temperature, once the knob is turned back to a lower temperature the old setting is restored.

The outer knob part in accordance with this invention is provided with a radially deflectable knob fixed to the abutment, and a spring radially biasing the knob and the abutment into the normal position. As mentioned above the inner knob part is provided with an angularly extending scale and the apparatus further has according to the invention a ring fixed on the housing level with the scale and having a window alignable with the scale. At least the outer knob part is made of plastic.

BRIEF DESCRIPTION OF THE DRAWINGS

The above and other objects, features, and advantages will become more readily apparent from the following, reference being made to the accompanying drawing in which.

SPECIFIC DESCRIPTION

Figure 1:
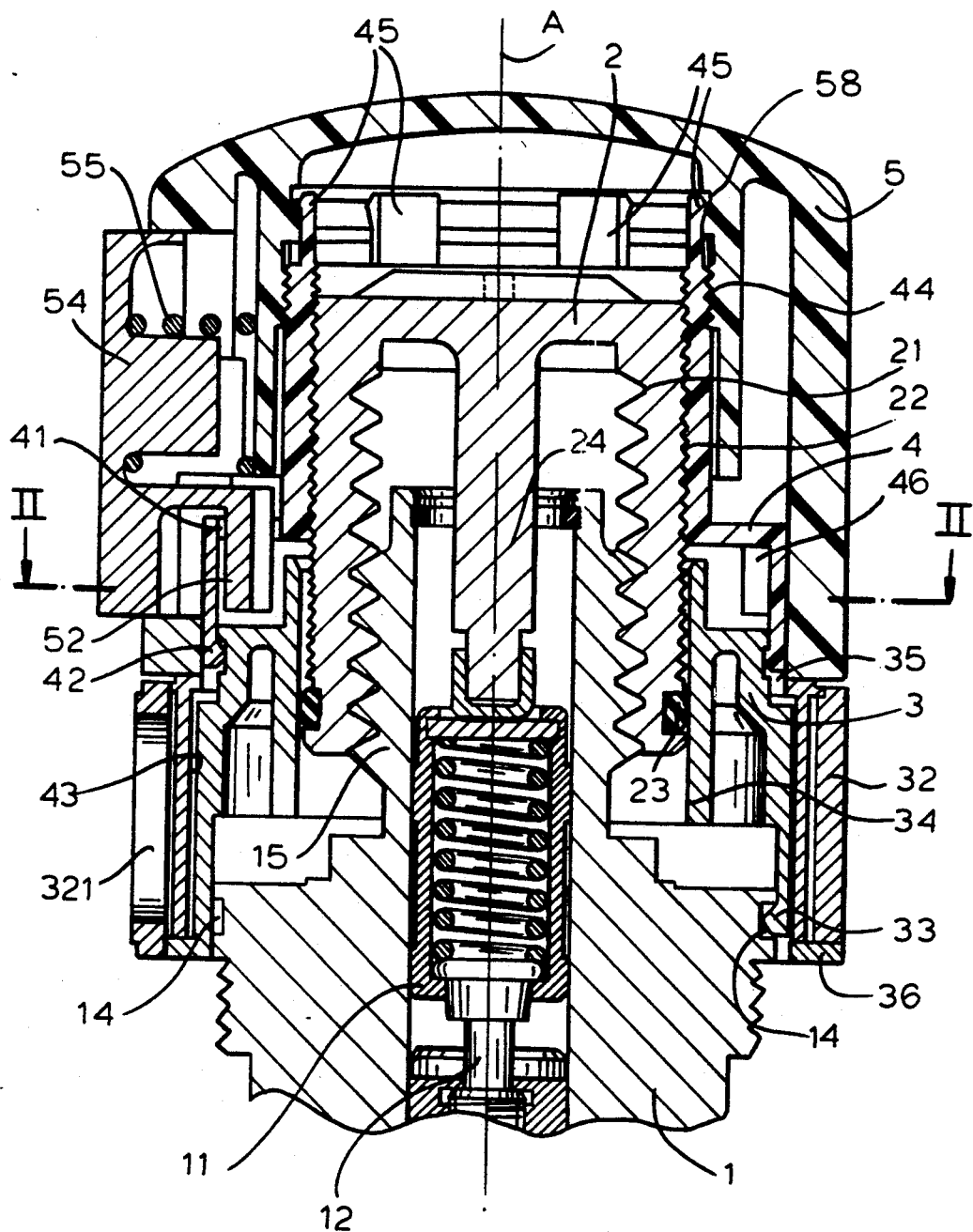
FIG. 1 is an axial section through the valve and its controller according to the invention.
Figure 2:
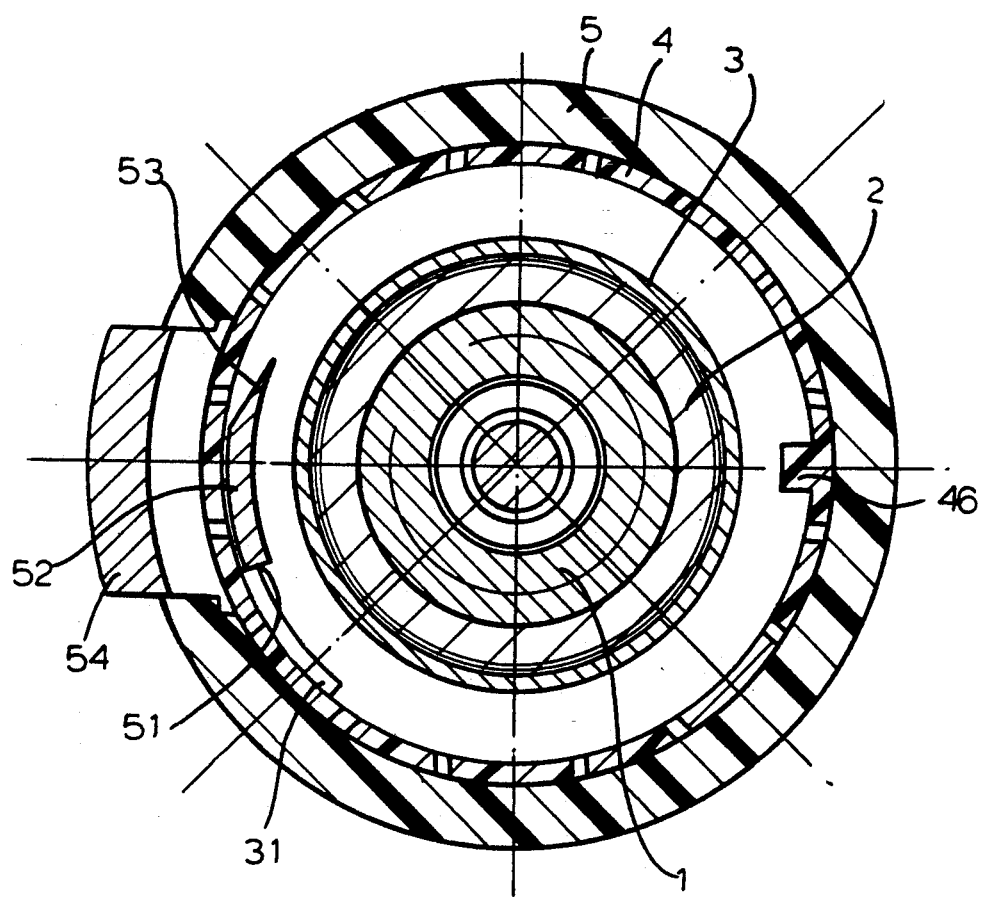
FIGS. 2 and 3 are sections taken respectively along lines II—II and III—III of FIG. 1.
Figure 3:
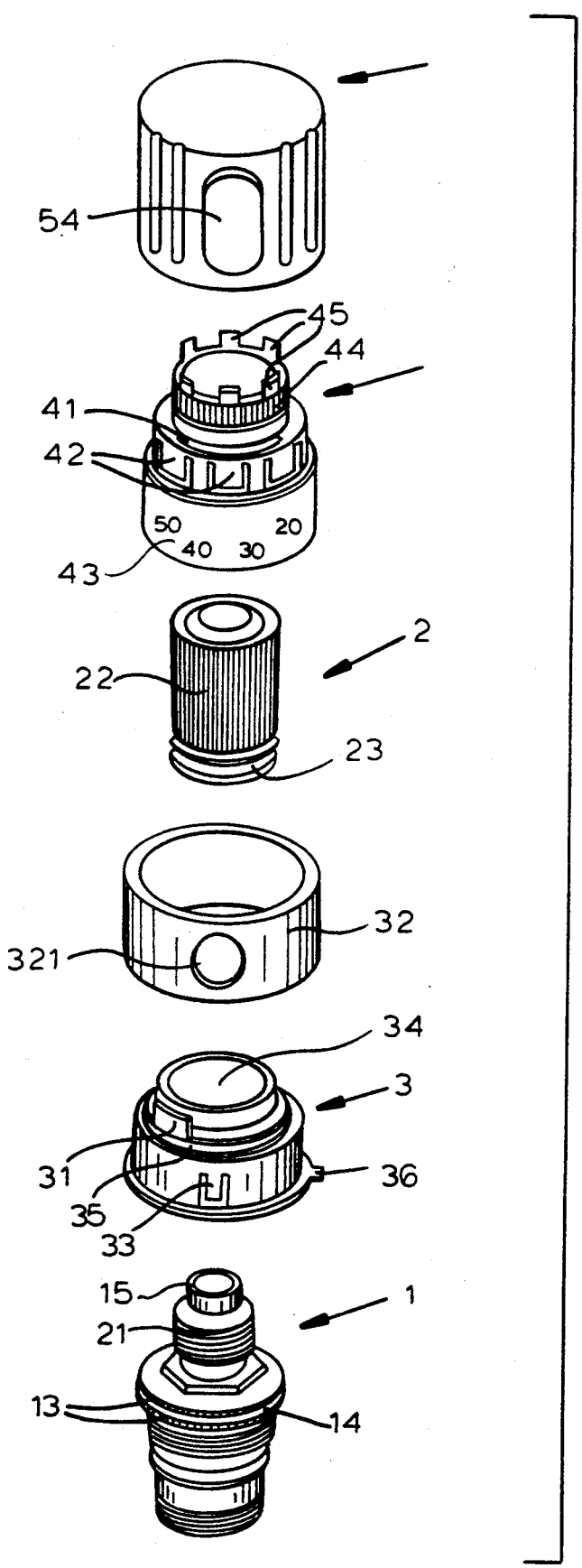

As seen in FIGS. 1 through 3 a thermostatically regulated valve such as described in above-cited German patent 3,530,812 has a housing 1 in which a valve stem 12 is displaceable along an axis A to adjust mixed-water temperature. An adjustment nut 2 is mounted on a collar 15 of the housing 1 by means of a screwthread 21 and has a stem 24 bearing axially via a pressure limiter 11 on the valve stem 12. Thus as this nut 2 is screwed up and down on the collar 15 it displaces the stem 12 and sets the temperature for the valve.

An abutment ring 3 has a central passage 34 that fits closely over the nut 2 and an elastic ring 23 set in the nut 2 bears radially outward on the ring 3 to inhibit free rotation of this nut 2 relative to the ring 3. The lower end of the ring 3 fits snugly over axially grooved annular ridges 13 (see FIG. 3) formed on the valve housing 1 and has radially deflectable fingers 33 engaged in a groove 14 formed between them. Thus this ring 3 is fixed on the housing 1 against rotation or axial movement. An axially extending abutment tongue or stop 31 is formed on the ring 3 and is fixed relative to the housing 1, like the ring 3.

An inner knob part or sleeve 4 is rotationally coupled to the nut 2 by axially extending and interfitting grooves and ridges 22 formed on the outer surface of the nut 2 and inner surface of the sleeve 4. A large-diameter lower region of this sleeve 4 is formed as a cylindrical skirt bearing a temperature scale 43. A cylindrical sleeve 32 engaged over this scale 43 is formed with a window 321 through which the numbers of the scale 43 are visible, with a radially projecting tab 36 on the ring 3 fixing the sleeve 32 angularly in place on the housing 1.

A medium-diameter middle part of the sleeve 4 is formed with radially deflectable fingers 42 whose ends can engage in a radially outwardly open groove 35 formed in the ring 3, axially coupling the parts 3 and 4 together but permitting them to rotate relative to each other about the axis A. A radially inwardly projecting stop or abutment 46 formed on the inner knob sleeve 4 extends into the path of the stop 31 to limit relative rotation of the two parts 3 and 4 to less than 360°.

A small-diameter upper part of the sleeve 4 is formed with radially deflectable fingers 45 that snap into a radially inwardly open groove 58 of an outer knob part 5 that is cup-shaped and that fits down over the parts 2 and 3, covering them to the upper edge of the windowed scale sleeve 32 and preventing the ring 32 from moving axially upward, that is away from the housing 1. The inner surface of the outer part 5 and the inner surface of the inner part 4 are formed with axially extending and radially interfitting ridges and grooves 44 that rotationally couple the two parts 4 and 5 together.

A radially depressible button 54 fitting in a complementary aperture of the part 5 is urged radially outward by a compression spring 55 and carries an abutment 52. The shoulder between the scale-carrying large-diameter lower ring portion and the medium-diameter middle portion is formed with an axially throughgoing and angularly extending slot 41 through which the abutment 52 projects. This abutment 52 is angularly engageable with the stop 31 when the button 54 is in the illustrated outer position. The abutment 52 can be depressed inward to clear the stop 31 and has one beveled edge 53 that, if brought angularly into engagement with the stop 31, will elastically cam the abutment 52 inward and allow it to angularly pass the stop 31.

The system described above operates as follows:

Under normal circumstances the angular travel of the knob 4, 5 is limited by the angular spacing between the abutments 46 and 52 which are both carried on the knob 4, 5 and which flank the stop 31 which is carried on the stationary ring 3. Thus the knob 4, 5 can be rotated between end positions normally correspond to full-cold and warm. In the hot-water end position the abutment 52 bears angularly on one edge of the stop 31 and in the cold-water end position the abutment 46 bears angularly on the opposite edge of the stop 31.

If the user needs to set the water to a hotter temperature, the button 54 can be depressed to take the abutment 52 out of the path of the stop 31, thereby allowing the knob 4, 5 to be spun around until the far side of the abutment 46 strikes the stop 31. When turned back past the normal maximum setting, however, the angled edge 53 of the abutment 52 will allow this abutment 52 to be cammed in and slide over the stop 31, restoring the previously established settings. All this time the window 321 will expose the portion of the scale 43 corresponding to the normal maximum temperature.

To change the maximum-temperature setting the outer knob part 5 is forcibly pulled axially up off the part 4, with elastic deformation of the tongues 45, and then rotated to the new position and is pushed back down so the abutment 52 is level with the stop 31 and the new desired maximum temperature is shown in the window 321. This angularly moves the abutment 52.

Figure 4:
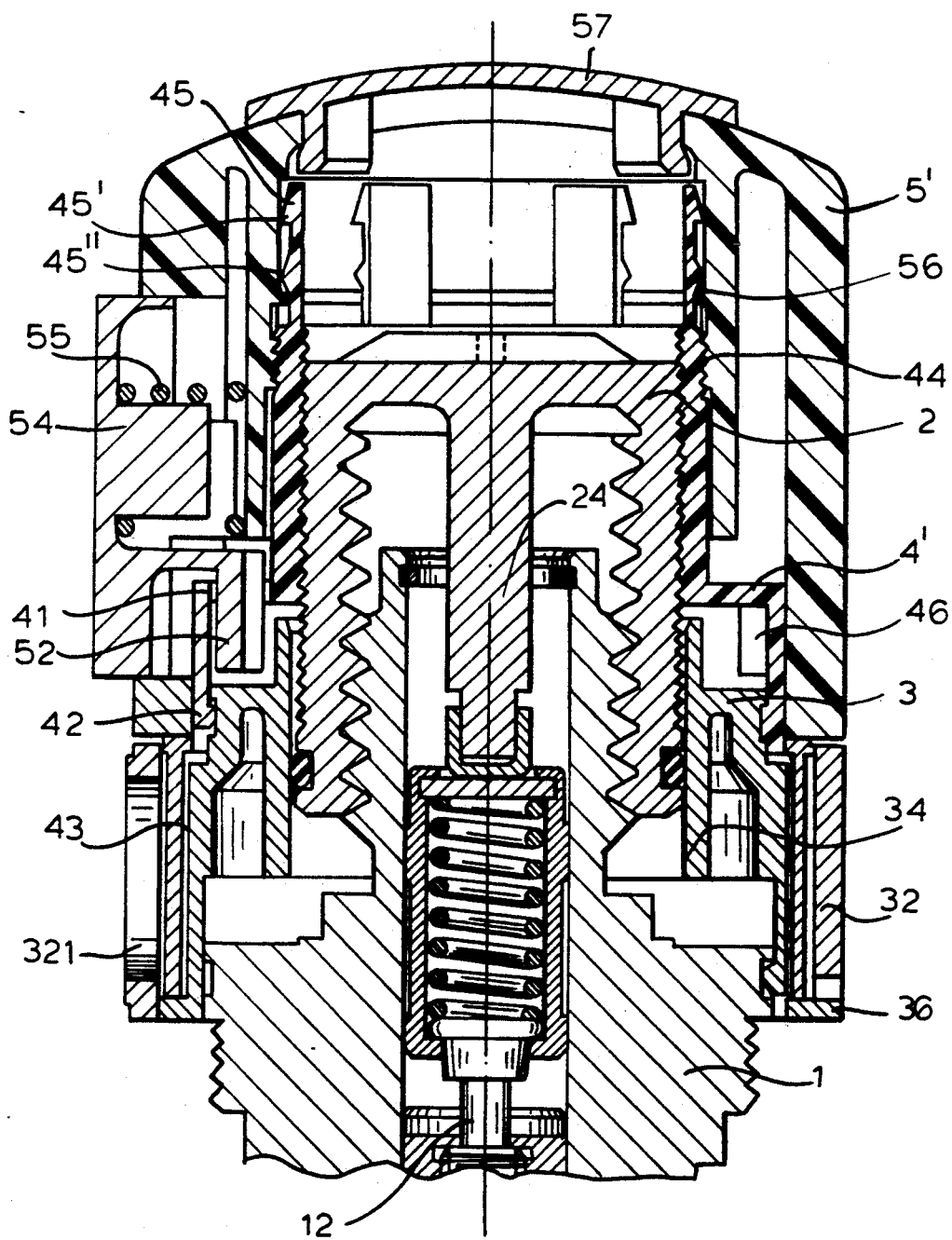
FIG. 4 is a section like FIG. 1 showing an alternative arrangement according to the invention.

In the arrangement of FIG. 4 identical parts bear reference numerals identical to those of FIGS. 1 through 3. Here the inner knob part 4' is formed with tongues 45 having outer right-angle barbs 45' and inner rounded bumps 45" that can engage over a right-angle shoulder 56 formed on the inside of the part 5'. Once the right-angle barbs 45' have been pushed axially past the shoulder 56 subsequent removal of the part 5 is only possible by removing an end cap 57 and prying the ringers 45 inward. When the rounded bumps 45" are pushed axially past the shoulder 56 the grooves and ridges 44 interengage and the abutment 52 is moved axially level with the stop 31. Thus to adjust this system the outer knob part 5' is pulled out sufficiently to pull the shoulder 56 over the lower bumps 45, thereby allowing the part 5' to be rotated on the part 4, and afterward it is pushed back to the illustrated use position. Thus even when being adjusted the outer knob part 5' will hang in place via the barbs 45".

The systems described above are assembled by first fitting the ring 3 over the stem 1, then fitting the sleeve 32 and nut 2 into position. The inner knob part 4 is then slid down over the knob 2 and the outer knob part 5 is fitted to the part 4 to lock the latter's fingers 42 into the groove 35 and hold the entire assembly together.

We claim:

1. In combination with a thermostatically regulated mixing valve having a housing and a stem extending along an axis in the housing and axially displaceable to adjust the thermostatically regulated temperature of the valve, the control apparatus comprising:

a nut threaded on the housing, axially linked to the valve stem, and rotatable about the axis in one direction to move axially inward and move the stem axially inward and in the opposite direction to move axially outward and move the stem axially outward;

an inner knob part formed with an angularly extending and axially throughgoing slot;

formations axially coupling the inner knob part to the housing and formations rotationally coupling the inner knob part to the nut, whereby the inner knob part rotates with the nut but does not move axially therewith;

a stop fixed relative to the housing offset from the axis;

an outer knob part carrying an abutment projecting through the slot and displaceable between a normal position angularly engageable with the stop and a displaced position angularly out of alignment with the stop; and means including formations releasably securing the outer knob part on the inner knob part in any of a plurality of angularly offset positions relative to each other.

2. The valve-control apparatus defined in claim 1 wherein the formations axially coupling the inner knob part to the housing include a radially outwardly open groove in the housing and radially deflectable latching fingers engageable in the groove, the outer knob part having a wall blocking radial outward deflection of the fingers when the outer knob part is in the normal position.

3. The valve-control apparatus defined in claim 1 wherein the inner knob part has a large-diameter lower part bearing a temperature scale, an intermediate diameter middle part carrying the respective axial coupling formations, and a small-diameter upper part carrying the respective rotational-coupling formations.

4. The valve-control apparatus defined in claim 1 wherein the securing formations include a plurality of radially deflectable and axially extending snap fingers operatively engageable with the housing.

5. The valve-control apparatus defined in claim 1 wherein in the adjustment position the securing formations prevent separation of the knob parts from each other.

6. The valve-control apparatus defined in claim 1 wherein the outer-knob-part abutment has one end formed with an inclined surface cammingly engageable with the stop on rotation of the outer knob part in a direction decreasing water temperature to elastically deflect the abutment into the displaced position.

7. The valve-control apparatus defined in claim 1 wherein the outer knob part is provided with a radially deflectable knob fixed to the abutment, and a spring radially biasing the knob and the abutment into the normal position.

8. The valve-control apparatus defined in claim 1 wherein the inner knob part is provided with an angularly extending scale, the apparatus further comprising a ring fixed on the housing level with the scale and having a window alignable with the scale.

9. The valve-control apparatus defined in claim 1 wherein at least the outer knob part is made of plastic.

* * * * *